(12) United States Patent
Kim et al.

(10) Patent No.: US 10,484,235 B2
(45) Date of Patent: Nov. 19, 2019

(54) POWER MANAGEMENT METHOD IN NETWORK AND APPARATUS FOR THE SAME

(71) Applicants: Hyundai Motor Company, Seoul (KR); Kia Motors Corporation, Seoul (KR); Yura Corporation Co., Ltd., Gyeonggi-do (KR)

(72) Inventors: Woo Sub Kim, Gyeonggi-do (KR); Seong Jin Park, Gyeonggi-Do (KR); Han Sop Kim, Gyeonggi-Do (KR); Seung Rok Dan, Gyeonggi-Do (KR)

(73) Assignees: Hyundai Motor Company, Seoul (KR); Kia Motors Corporation, Seoul (KR); Yura Corporation Co., Ltd., Seongnam, Gyeonggi-do (KR)

( * ) Notice: Subject to any disclaimer, the term of this patent is extended or adjusted under 35 U.S.C. 154(b) by 285 days.

(21) Appl. No.: 15/481,926

(22) Filed: Apr. 7, 2017

(65) Prior Publication Data

US 2017/0302508 A1    Oct. 19, 2017

(30) Foreign Application Priority Data

Apr. 14, 2016    (KR) .................... 10-2016-0045566

(51) Int. Cl.
| | |
|---|---|
| *H04L 12/24* | (2006.01) |
| *H04L 29/12* | (2006.01) |
| *H04L 29/08* | (2006.01) |
| *H04L 12/26* | (2006.01) |
| *H04L 12/10* | (2006.01) |

(52) U.S. Cl.
CPC .......... *H04L 41/0668* (2013.01); *H04L 12/10* (2013.01); *H04L 41/0677* (2013.01); *H04L 43/0817* (2013.01); *H04L 61/103* (2013.01); *H04L 61/35* (2013.01); *H04L 67/12* (2013.01); *H04L 61/6022* (2013.01)

(58) Field of Classification Search
None
See application file for complete search history.

(56) References Cited

U.S. PATENT DOCUMENTS

| | | | | |
|---|---|---|---|---|
| 8,018,349 | B1* | 9/2011 | Getker | .................. H04L 12/413 |
| | | | | 340/660 |
| 9,738,125 | B1* | 8/2017 | Brickley | ................. H04W 4/70 |
| 2006/0062141 | A1* | 3/2006 | Oran | .................. H04L 12/2854 |
| | | | | 370/216 |
| 2006/0250951 | A1* | 11/2006 | Ueda | ....................... H04L 45/00 |
| | | | | 370/217 |
| 2014/0355158 | A1* | 12/2014 | Metzner | .............. H04L 25/0272 |
| | | | | 361/63 |

(Continued)

*Primary Examiner* — Chi H Pham
*Assistant Examiner* — Vladislav Y Agureyev
(74) *Attorney, Agent, or Firm* — Mintz Levin Cohn Ferris Glovsky and Popeo, P.C.; Peter F. Corless

(57) ABSTRACT

An operation method of a first communication node includes: measuring a magnitude of a current supplied to a second communication node through a data line in the vehicle network; comparing the measured magnitude of the current with a predetermined threshold value; generating an address resolution protocol (ARP) frame including fault-related information when the second communication node is determined to be in a fault state based on a result of the comparison; and transmitting the ARP frame.

16 Claims, 7 Drawing Sheets

(56) References Cited

U.S. PATENT DOCUMENTS

2016/0142225 A1* 5/2016 Taniguchi ............ H04L 12/437
                                                          370/223
2016/0320441 A1* 11/2016 Du ....................... G01R 31/025
2017/0310580 A1* 10/2017 Caldwell ................. H04L 45/74
2018/0248910 A1* 8/2018 Tu ....................... H04L 63/0227
2018/0287658 A1* 10/2018 Cosic .................. H04L 41/0803

\* cited by examiner

POWER MANAGEMENT METHOD IN NETWORK AND APPARATUS FOR THE SAME

CROSS-REFERENCE TO RELATED APPLICATION

This application claims the benefit of and priority to Korean Patent Application No. 10-2016-0045566, filed on Apr. 14, 2016 in the Korean Intellectual Property Office (KIPO), the entirety of which is incorporated by reference as if fully set forth herein.

TECHNICAL FIELD

The present disclosure relates to power management methods, and more specifically, to power management methods based on a state of a communication node in a vehicle network and apparatuses for the same.

BACKGROUND

The number and variety of electronic devices installed within vehicles have been increasingly significantly along with the recent digitalization of vehicle parts. Generally, electronic devices may be used throughout the vehicle, such as in a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices used in each of these systems are connected via a vehicle network, which supports functions of the electronic devices. For instance, a vehicle CAN may support a transmission rate of up to 1 Mbps, automatic retransmission of colliding messages, error detection based on a cycle redundancy interface (CRC), and the like. The FlexRay-based network may support a transmission rate of up to 10 Mbps, simultaneous transmission of data through two channels, synchronous data transmission, and the like. The MOST-based network is a communication network for high-quality multimedia, which may support a transmission rate of up to 150 Mbps.

Meanwhile, the telematics system and the infotainment system, like most enhanced safety systems of a vehicle, require higher transmission rates and system expandability. However, the CAN, FlexRay-based network, and the like may not sufficiently support such requirements. The MOST-based network, in particular, may support a higher transmission rate than the CAN or FlexRay-based network. However, applying the MOST-based network to vehicle networks can be costly. Due to these limitations, an Ethernet-based network is often utilized as a vehicle network. The Ethernet-based network may support bi-directional communication through one pair of windings and may support a transmission rate of up to 10 Gbps. The Ethernet-based vehicle network may include a plurality of communication nodes. The communication node may be a gateway, a switch (or bridge), an end node, or the like.

The power line for power supply in a vehicle network may be separated from the data line used for communications between electronic devices in the vehicle network. In this case, electronic devices may acquire power through the power line and receive data through the data line. Alternatively, power and data in a vehicle network may be transmitted over a single line. However, in such a vehicle network, an over-current may be generated in the power line when a fault occurs in an electronic device (for example, when a circuit constituting the electronic device is in a short or open state). The over-current may damage the electronic device, the power line, and the power source.

SUMMARY

The present disclosure provides methods and apparatuses for controlling power supply based on a state of a communication node in a vehicle network. The present disclosure also provides methods and apparatuses for reporting fault-related information in a vehicle network.

In accordance with embodiments of the present disclosure, an operation method of a first communication node in a vehicle network includes: measuring a magnitude of a current supplied to a second communication node through a data line in the vehicle network; comparing the measured magnitude of the current with a predetermined threshold value; generating an address resolution protocol (ARP) frame including fault-related information when the second communication node is determined to be in a fault state based on a result of the comparison; and transmitting the ARP frame.

The fault-related information may include at least one of: an indicator indicating whether a fault has occurred, a code indicating a type of a fault, and an identifier of the second communication node in the fault state.

The code indicating the type of the fault may be included in an operation field included in an ARP header of the ARP frame.

The identifier of the second communication node in the fault state may be a physical (PHY) layer address or a medium access control (MAC) layer address.

The magnitude of the current is measured by a switch controlling a power supply included in the first communication node.

The first communication node is a gateway.

The operation method may further include: determining the second communication node is in a short state when the measured magnitude of the current is greater than the predetermined threshold value, and determining the second communication node is in an open state when the measured magnitude of the current is less than the predetermined threshold value.

The operation method may further include: determining the second communication node is in a short state when a current greater than the predetermined threshold value lasts for a predetermined time or longer, and determining the second communication node is in an open state when a current less than the predetermined threshold value lasts for the predetermined time or longer.

The operation method may further comprise stopping power supply to the second communication node through the data line when the second communication node is determined to be in the fault state.

The operation method may further comprise storing the fault-related information in a database when the second communication node is determined to be in the fault state.

Further, in accordance with embodiments of the present disclosure, an operation method of a first communication node in a vehicle network includes: receiving an address resolution protocol (ARP) frame including fault-related information from a second communication node in the vehicle network; obtaining the fault-related information from the ARP frame; and identifying a fault state of a third communication node in the vehicle network based on the fault-related information.

The fault-related information may include at least one of an indicator indicating whether a fault has occurred, a code indicating a type of a fault, and an identifier of a communication node in a fault state.

The code indicating the type of the fault may be included in an operation field included in an ARP header of the ARP frame.

The identifier indicating whether the fault has occurred may be a physical (PHY) layer address or a medium access control (MAC) layer address.

Further, in accordance with embodiments of the present disclosure, a first communication node in a vehicle network includes: at least one switch controlling a power supply; a processor controlling the at least one switch; and a memory storing at least one instruction code executed by the processor. When the at least one stored instruction code is executed, the processor is caused to: measure a magnitude of a current supplied to a second communication node through a data line in the vehicle network; compare the measured magnitude of the current with a predetermined threshold value; generate an address resolution protocol (ARP) frame including fault-related information when the second communication node is determined to be in a fault state based on a result of the comparison; and transmit the ARP frame.

The fault-related information may include at least one of an indicator indicating whether a fault has occurred, a code indicating a type of a fault, and an identifier of the second communication node in the fault state.

The code indicating the type of the fault may be included in an operation field included in an ARP header of the ARP frame.

The identifier of the second communication node in the fault state may be a physical (PHY) layer address or a medium access control (MAC) layer address.

The second communication node may be determined to be in a short state when the measured magnitude of the current is greater than the predetermined threshold value, and the second communication node may be determined to be in an open state when the measured magnitude of the current is less than the predetermined threshold value.

The second communication node may be determined to be in a short state when a current greater than the predetermined threshold value lasts for a predetermined time or longer, and the second communication node may be determined to be in an open state when a current less than the predetermined threshold value lasts for the predetermined time or longer.

According to the embodiments of the present disclosure, a gateway (e.g., a switch, a bridge, etc.) may include at least one power switch (e.g., an intelligent power switch (IPS), etc.) capable of supplying power to an end node via a data line and controlling power supply. The gateway may determine that the end node is in a fault state when the magnitude of the measured current (or voltage) at the power switch that controls the power supply is greater than or less than a reference current (or a reference voltage). The gateway may stop the power supply to the end node in the fault state. Thus, damages to a power source, the data line, and so forth can be prevented.

In addition, the gateway may generate an ARP frame including the fault-related information, and transmit the generated ARP frame in a broadcast manner. A communication node constituting a vehicle network (or a diagnostic apparatus located outside the vehicle network (e.g., a diagnostic apparatus supporting a diagnostic communication over internet protocol (DoIP)) may receive the ARP frame from the gateway, and identify whether or not a fault has occurred, the type of the fault, the communication node that is in the fault state, etc. based on the fault-related information. Therefore, performance of the vehicle network can be enhanced.

BRIEF DESCRIPTION OF DRAWINGS

Embodiments of the present disclosure will become more apparent by describing in detail forms of the present disclosure with reference to the accompanying drawings, in which.

Figure 1:
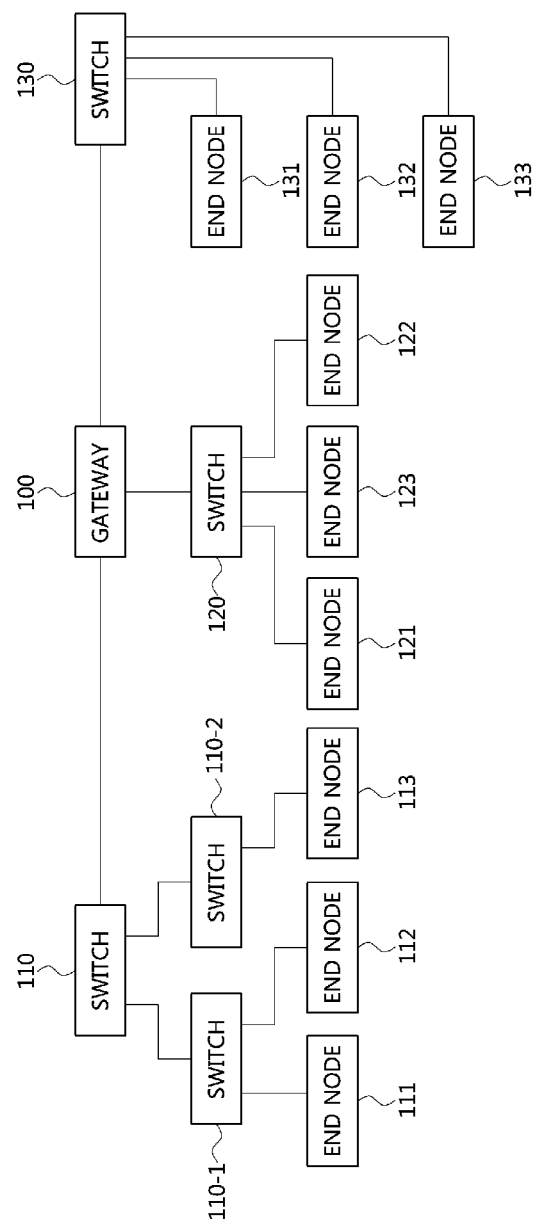
FIG. 1 is a diagram showing a vehicle network topology according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed by one or plurality of modules. Additionally, it is understood that a controller/control unit may perform one or more of the processes described further below, and the term controller/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Furthermore, control logic of the present disclosure may be embodied as non-transitory computer readable media on a computer readable medium containing executable program instructions executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, embodiments of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a diagram showing a vehicle network topology according to embodiments of the present disclosure.

As shown in FIG. 1, a communication node included in the vehicle network may be a gateway, a switch (or bridge), or an end node. The gateway 100 may be connected with at least one switch 110, 110-1, 110-2, 120, and 130 and may be configured to connect different networks. For example, the gateway 100 may support connection between a switch which supports a controller area network (CAN) (e.g., FlexRay, media oriented system transport (MOST), or local interconnect network (LIN)) protocol and a switch which supports an Ethernet protocol. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and control at least one of end nodes 111, 112, 113, 121, 122, 123, 131, 132, and 133 connected to the switch.

The end nodes 111, 112, 113, 121, 122, 123, 131, 132, and 133 may include an electronic control unit (ECU) configured to control various types of devices mounted within a vehicle. For example, the end nodes 111, 112, 113, 121, 122, 123, 131, 132, and 133 may include the ECU included in an infotainment device (e.g., a display device, a navigation device, and an around view monitoring (AVM) device).

The communication nodes (e.g., a gateway, a switch, an end node, or the like) included in the vehicle network may be connected in a star topology, a bus topology, a ring topology, a tree topology, a mesh topology, or the like. In addition, the communication nodes of the vehicle network may support the CAN protocol, the FlexRay protocol, the MOST protocol, the LIN protocol, or the Ethernet protocol. Embodiments of the present disclosure may be applied to the foregoing network topologies. However, the network topology to which embodiments of the present disclosure may be applied is not limited thereto and may be configured in various ways.

Figure 2:
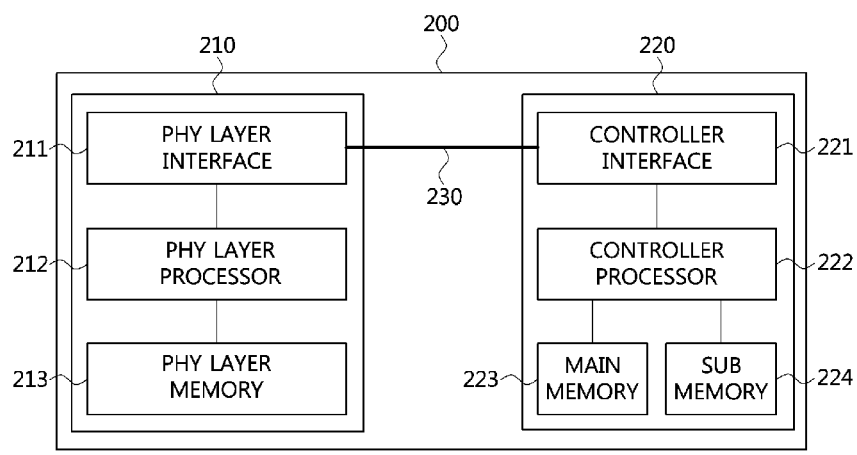
FIG. 2 is a diagram showing a communication node constituting a vehicle network according to embodiments of the present disclosure.

FIG. 2 is a diagram showing a communication node constituting a vehicle network according to embodiments of the present disclosure. Notably, the various methods discussed below may be executed by a controller having a processor and a memory.

As shown in FIG. 2, a communication node 200 of a network may include a PHY layer 210 and a controller 220. In addition, the communication node 200 may further include a regulator (not shown) for supplying power. In particular, the controller 220 may be implemented to include a medium access control (MAC) layer. A PHY layer 210 may be configured to receive or transmit signals from or to another communication node. The controller 220 may be configured to control the PHY layer 210 and perform various functions (e.g., an infotainment function, or the like.). The PHY layer 210 and the controller 220 may be implemented as one system on chip (SoC), or alternatively may be implemented as separate chips.

Furthermore, the PHY layer 210 and the controller 220 may be connected via a media independent interface (MII) 230. The MII 230 may include an interface defined in the IEEE 802.3 and may include a data interface and a management interface between the PHY layer 210 and the controller 220. One of a reduced MII (RMII), a gigabit MII (GMII), a reduced GMII (RGMII), a serial GMII (SGMII), a 10 GMII (XGMII) may be used instead of the MII 230. A data interface may include a transmission channel and a reception channel, each of which may have an independent clock, data, and a control signal. The management interface may include a two-signal interface, one signal for the clock and one signal for the data.

Particularly, the PHY layer 210 may include a PHY layer interface 211, a PHY layer processor 212, and a PHY layer memory 213. The configuration of the PHY layer 210 is not limited thereto, and the PHY layer 210 may be configured in various ways. The PHY layer interface 211 may be configured to transmit a signal received from the controller 220 to the PHY layer processor 212 and transmit a signal received from the PHY layer processor 212 to the controller 220. The PHY layer processor 212 may be configured to execute operations of the PHY layer interface 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PHY layer processor 212.

The controller 220 may be configured to monitor and control the PHY layer 210 using the MII 230. The controller 220 may include a controller interface 221, a controller processor 222, a main memory 223, and a sub memory 224. The configuration of the controller 220 is not limited thereto, and the controller 220 may be configured in various ways. The controller interface 221 may be configured to receive a signal from the PHY layer 210 (e.g., the PHY layer interface 211) or an upper layer (not shown), transmit the received signal to the controller processor 222, and transmit the signal received from the controller processor 222 to the PHY layer 210 or the upper layer. The controller processor 222 may further include independent memory control logic or integrated memory control logic for controlling the controller interface 221, the main memory 223, and the sub memory 224. The memory control logic may be implemented to be included in the main memory 223 and the sub memory 224 or may be implemented to be included in the controller processor 222.

Furthermore, each of the main memory 223 and the sub memory 224 may be configured to store a signal processed by the controller processor 222 and may be configured to output the stored signal based on a request from the controller processor 222. The main memory 223 may be a volatile memory (e.g., RAM) configured to temporarily store data required for the operation of the controller processor 222. The sub memory 224 may be a non-volatile memory in which an operating system code (e.g., a kernel and a device driver) and an application program code for performing a function of the controller 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

A method performed by a communication node and a corresponding counterpart communication node in a vehicle network will be described below. Although the method (e.g., signal transmission or reception) performed by a first communication node, the method is applicable to a second communication node that corresponds to the first communication node. In other words, when an operation of the first communication node is described, the second communication node corresponding thereto may be configured to perform an operation that corresponds to the operation of the first communication node. Additionally, when an operation of the second communication node is described, the first communication node may be configured to perform an operation that corresponds to an operation of a switch.

Figure 3:
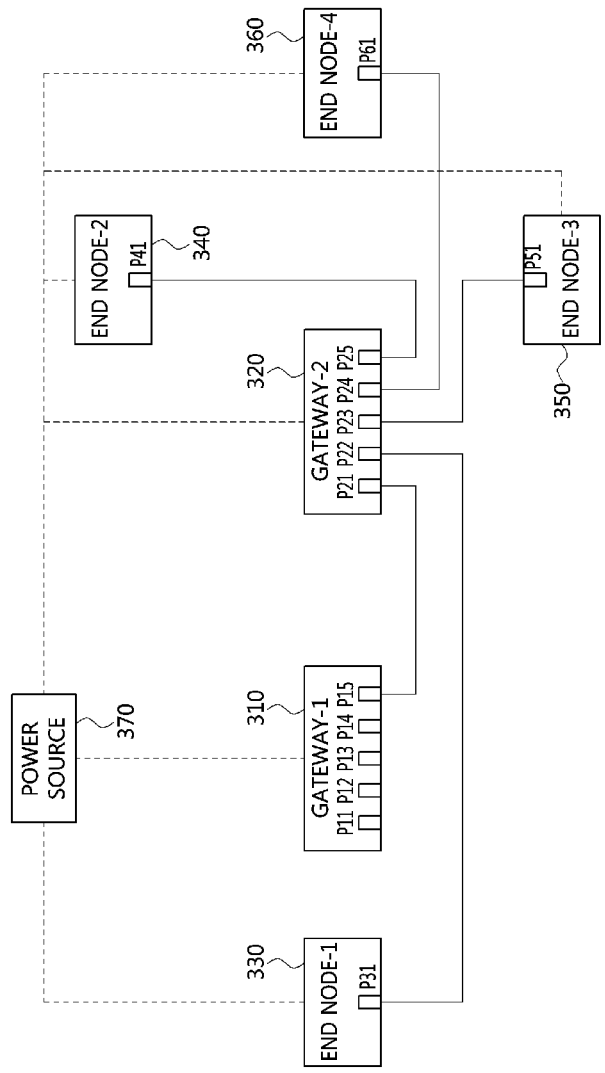
FIG. 3 is a diagram showing a vehicle network topology according to embodiments of the present disclosure.

FIG. 3 is a diagram showing an additional vehicle network topology according to embodiments of the present disclosure.

As shown in FIG. 3, a vehicle network may include gateways 310 and 320, end nodes 330, 340, 350 and 360, and a power source 370. The gateways 310 and 320 may be switches, bridges, and the like. In the end nodes 330, 340, 350, and 360, cameras may be installed. For example, the first end node 330 may comprise a front camera that photographs the front of the vehicle. The second end node 340 may comprise a right camera that photographs the right side of the vehicle. The third end node 350 may comprise a left camera that photographs the left side of the vehicle. The fourth end node 360 may comprise a rear camera that photographs the rear of the vehicle. The power source 370 may be a battery that supplies powers to the entities constituting the vehicle network.

In FIG. 3, solid lines connecting the entities in the vehicle network may be data lines, and data may be transmitted through the data lines. The data lines may comprise cables, connectors, etc. for low voltage differential signaling (LVDS). Also, dashed lines connecting the entities may be power lines through which the powers may be transferred. The communication nodes 310, 320, 330, 340, 350, and 360 constituting the vehicle network may be connected to the power source 370 through the power lines, obtain the powers via the power lines, and operate based on the obtained powers.

The first gateway 310 may be coupled to the second gateway 320 (e.g., a port P21 of the second gateway 320) via a port P15. The second gateway 320 may be connected to the first end node 330 (e.g., a port P31 of the first end node 330) via a port P22, and to the third end node 350 (e.g., a port P51 of the third end node 350) via a port P23. Also, the second gateway 320 may be connected to the fourth end node 360 (e.g., a port P61 of the fourth end node 360) via a port P24, and to the second end node 340 (e.g., a port P41 of the second end node 340) via a port P25.

The communications between the second gateway 320 and each of the end nodes 330, 340, 350, and 360 may be performed based on the LVDS. For example, the first end node 330 may transmit front images of the vehicle to the second gateway 320 based on the LVDS, and the second end node 340 may transmit right images of the vehicle to the second gateway 320. The third end node 350 may transmit left images of the vehicle to the second gateway 320 based on the LVDS and the fourth end node 360 may transmit rear images of the vehicle to the second gateway 320.

In such the vehicle network, when a fault occurs in the end node 330, 340, 350, or 360 (e.g., when the circuitry constituting the end node 330, 340, 350, or 360 is in a short state or an open state), an over-current (or, an over-voltage) may be generated, which may damage the end node 330, 340, 350, or 360, the power lines, and the like. It may take a lot of time and costs to replace damaged end node 330, 340, 350, or 360, power lines, and the like.

Meanwhile, power over Ethernet (PoE), power over data lines (PoDL), and the like may be applied to the vehicle network. In this case, power and data in the vehicle network may be transmitted over a single line. For example, power may be transferred over the data line used for communications. The vehicle network according to the above schemes may be configured as follows.

Figure 4:
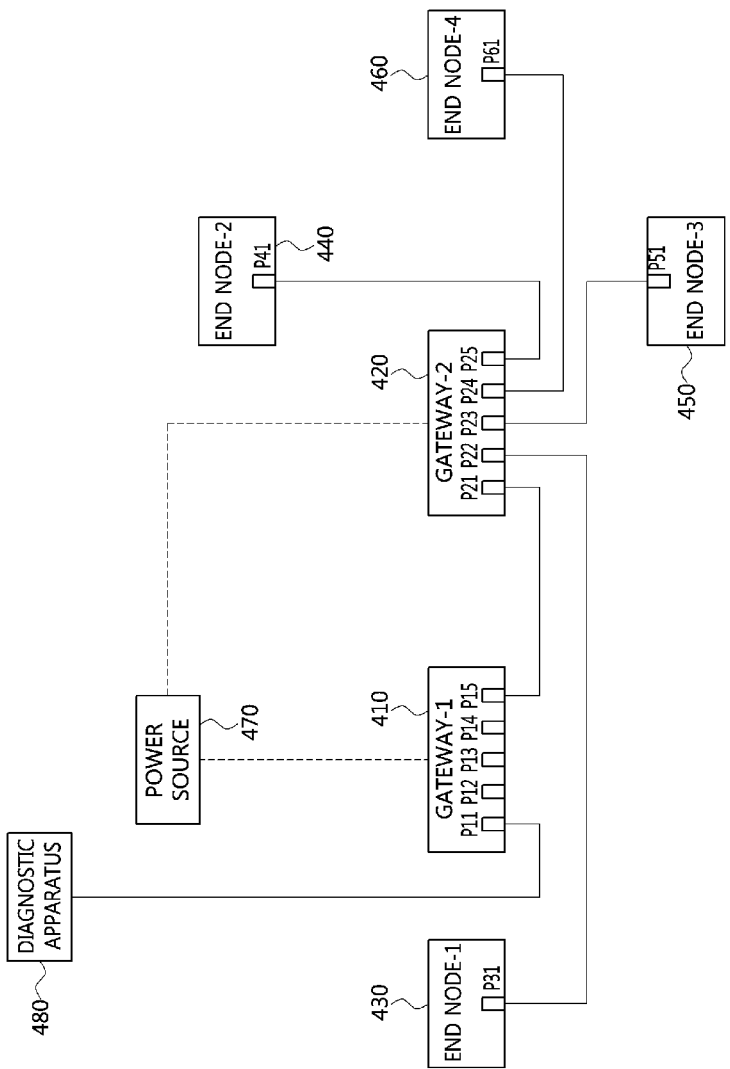
FIG. 4 is a diagram showing a vehicle network topology according to embodiments of the present disclosure.

FIG. 4 is a diagram showing an additional vehicle network topology according to embodiments of the present disclosure.

As shown in FIG. 4, a vehicle network may comprise gateways 410 and 420, end nodes 430, 440, 450 and 460, and a power source 470. The communication nodes 410, 420, 430, 440, 450 and 460 constituting the vehicle network may support RFC 1180, IEEE 802.2 standard, and the like. The gateways 410 and 420 may be switches, bridges, and the like. The gateways 410 and 420 may reset the hardware when diagnostics, reprogramming, etc. are performed on the end nodes 430, 440, 450, and 460.

In the end nodes 430, 440, 450, and 460, cameras may be installed. For example, the first end node 430 may comprise a front camera that photographs the front images of the vehicle. The second end node 440 may comprise a right camera that photographs the right side of the vehicle. The third end node 450 may comprise a left camera that photographs the left side of the vehicle. The fourth end node 460 may comprise a rear camera that photographs the rear of the vehicle.

The power source 470 may be a battery that supplies powers to the entities constituting the vehicle network. The diagnostic apparatus 480 may be used to diagnose the conditions of the entities and the vehicle network, and may be located outside the vehicle network. The diagnostic apparatus 480 may support a diagnostic communication over internet protocol (DoIP). Similarly to the case of FIG. 3, solid lines connecting the entities in the vehicle network may be data lines, and data may be transmitted through the data lines. The data lines may be configured with Ethernet cables, Ethernet connectors, etc. for Ethernet data signaling. For example, the data lines may be configured with cables (e.g., unshielded single twisted pair cables) defined in the BroadR-Reach specification, etc. Also, dashed lines connecting the entities may be power lines through which the powers may be transferred.

The gateways 410 and 420 may be connected to the power source 370 through the power lines, obtain the powers via the power lines, and operate based on the obtained powers. The gateways 410 and 420 may provide powers to the end nodes 430, 440, 450, and 460 through the data lines, unlike the gateways 310 and 320 shown in FIG. 3. The end nodes 430, 440, 450 and 460 may obtain powers from the gateways 410 and 420 via the data lines unlike the end nodes 330, 340, 350 and 360 shown in FIG. 3, and may operate based on the obtained powers.

The first gateway 410 may be connected to the diagnostic apparatus 480 via a port P11 and may be connected to the second gateway 420 (e.g., a port P21 of the second gateway 420) via a port P15. The second gateway 420 may be connected to the first end node 430 (e.g., a port P31 of the first end node 430) via a port P22, and to the third end node 450 (e.g., a port P51 of the third end node 450) via a port P23. Also, the second gateway 420 may be connected to the fourth end node 460 (e.g., a port P61 of the fourth end node 460) via a port P24, and to the second end node 440 (e.g., a port P41 of the second end node 440) via a port P25.

Meanwhile, the gateways 410 and 420 may include switches (e.g., intelligent power switch (IPS), etc.) for controlling power supply. In the following description, a switch that controls power supply may be referred to as a power switch. The power supply may be controlled based on a magnitude of a current (or voltage) measured by the power switch. Hereinafter, the gateway 420 including power switches will be described. The gateway 410 may also have the same or similar configuration as the gateway 420.

Figure 5:
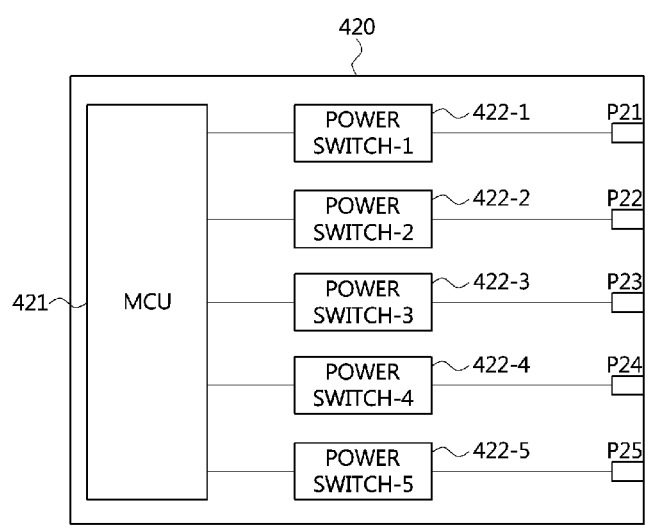
FIG. 5 is a block diagram illustrating a configuration of the second gateway in FIG. 4.

FIG. 5 is a block diagram illustrating a configuration of the second gateway in FIG. 4.

As shown in FIG. 5, the second gateway 420 may include a micro controller unit (MCU) 421, and at least one power switch 422-1, 422-2, 422-3, 422-4, and 422-5. The MCU 421 may be a PHY layer unit 212 or a MAC layer unit 222 described with reference to FIG. 2. The power switches 422-1, 422-2, 422-3, 422-4, and 422-5 may be provided respectively for the ports P21, P22, P23, P24, and P25. For example, each of the power switches 422-1, 422-2, 422-3, 422-4, and 422-5 may be connected to each of the ports P21, P22, P23, P24, and P25.

The MCU 421 may request power supply by transmitting an ON signal to each of the power switches 422-2, 422-3, 422-4, and 422-5. The power switches 422-2, 422-3, 422-4, and 422-5 may supply power to the end nodes 430, 440, 450, and 460 when they receive the ON signal. For example, the power may be transferred to the end nodes 430, 440, 450, and 460 through the power switches 422-2, 422-3, 422-4, and 422-5, the ports P22, P23, P24, and P25, and the power lines. Also, the power switches 422-2, 422-3, 422-4, and 422-5 may measure the magnitudes of the currents (or voltages) in real time, and report the measured results to the MCU 421. For example, the power switches 422-2, 422-3, 422-4, and 422-5 may report the magnitudes of the measured currents (or voltages) to the MCU 421 in real time. Alternatively, the power switches 422-2, 422-3, 422-4, and 422-5 may report the magnitudes of the currents (or voltages) to the MCU 421 when the measured magnitudes of the currents (or voltages) are greater than or less than a predetermined current threshold value.

Here, the predetermined current (or, voltage) threshold value may be the magnitude of the reference current (or reference voltage). The magnitude of the reference current (or reference voltage) may be determined based on an actual consumption current (or, voltage), a thickness or length of used cables, and the like. When the measured current is greater than the predetermined current threshold value (or when the measured voltage is less than the predetermined voltage threshold value), the corresponding end node connected to the corresponding power switch may be in a short state. When the measured current is smaller than the predetermined current threshold value (or the measured voltage is greater than the predetermined voltage threshold value), the corresponding end node connected to the corresponding power switch may be in an open state.

Meanwhile, the MCU 421 may compare the information (e.g., the magnitudes of the currents or the magnitudes of the voltages) obtained from the power switches 422-2, 422-3, 422-4, and 422-5 with the predetermined current (or, voltage) threshold value, thereby determining whether or not a fault has occurred and the type of the fault. For example, the MCU 421 may determine that a fault has occurred if the current (or voltage) that is greater than or less than the predetermined current (or, voltage) threshold value lasts for a predetermined time (for example, 100 ms). The predetermined time may be a time required for filtering such as ripple, noise, and the like. The MCU 421 may transmits an OFF signal to the corresponding power switch among the power switches 422-2, 422-3, 422-4, and 422-5 connected to the corresponding faulty end node among the end nodes 430, 440, 450, and 460. The corresponding power switch may stop the power supply when the OFF signal is received from the MCU 421.

In such the vehicle network, when a fault occurs in the end nodes 430, 440, 450, and 460 (e.g., when the circuitry constituting the end nodes 430, 440, 450, and 460 is in a short state or an open state), an over-current (or, an over-voltage) may occur, which may damage the end nodes 430, 440, 450, and 460. In the case of the vehicle network shown in FIG. 4, the power lines may not be damaged unlike the vehicle network shown in FIG. 3 even when an over-current (or an over-voltage) is generated. Thus, only the work to replace the damaged end node 430, 440, 450, or 460 may be necessary in this case.

Hereinafter, a method of controlling power supply, and a method of notifying the fault-related information at the gateway including the power switches will be described. Also, a switch (or bridge) including power switches may operate in the same or similar manner as the gateway described below.

Figure 6:
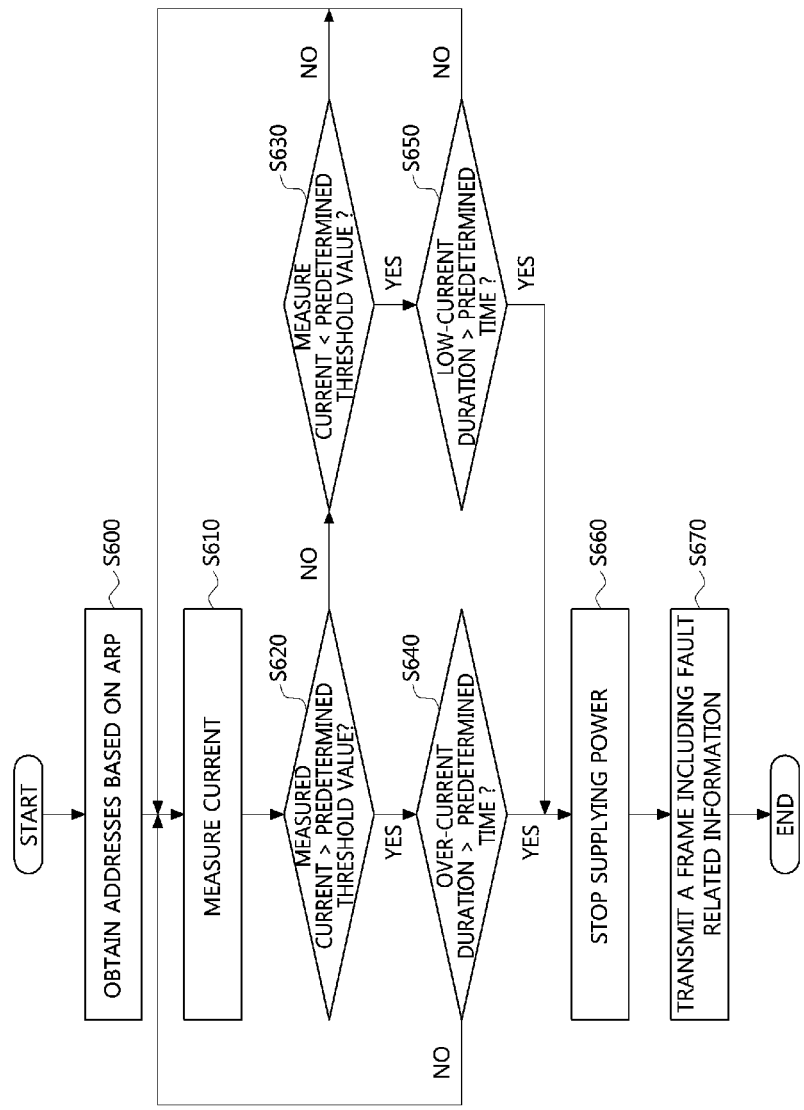
FIG. 6 is a flow chart explaining an operation method of a gateway according to embodiments of the present disclosure.

FIG. 6 is a flow chart explaining an operation method of a gateway according to embodiments of the present disclosure.

As shown in FIG. 6, a gateway may constitute the vehicle network described with reference to FIG. 4. For example, the gateway may be the same as or similar to the second gateway 420 described with reference to FIG. 5. For example, the gateway may include an MCU, at least one power switch, and the like. Also, the communication nodes (e.g., the gateways, the switches, the bridges, the end nodes, etc.) constituting the vehicle network may support an address resolution protocol (ARP).

When the vehicle network is established (e.g., when power is supplied to the vehicle network), the gateway may obtain addresses (e.g., MAC addresses) of the communication nodes (e.g., the communication nodes other than the gateway) based on the ARP (S600). For example, the gateway may check whether the MAC address of each of the communication nodes is present in an ARP cache table which the gateway manages, and generate an ARP request frame (or, an ARP request packet) when the MAC address of each of the communication nodes does not exist in the ARP cache table. The gateway may transmit the ARP request frame in a broadcast manner.

A communication node may receive the ARP request frame from the gateway. The communication node having received the ARP request frame may know that the transmission of the MAC address is requested, and accordingly may generate an ARP reply frame (or ARP reply packet) including the MAC address of the communication node. The communication node may transmit the ARP reply frame. The gateway may receive the ARP reply frame from the communication node and obtain the MAC address of the communication node from the ARP reply frame. The gateway may record the obtained MAC address of the communication node in the ARP cache table.

The ARP header included in the ARP frame may be configured as follows. Here, the ARP frame may be a frame generated based on the ARP. For example, the ARP frame may be an ARP request frame, an ARP reply frame, or the like.

Figure 7:
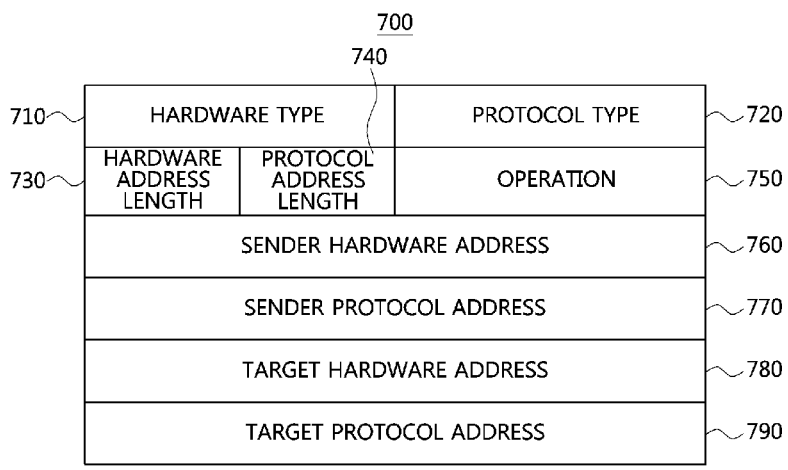
FIG. 7 is a block diagram illustrating an ARP header.

FIG. 7 is a block diagram illustrating an ARP header.

As shown in FIG. 7, an ARP header 700 may include a hardware type field 710, a protocol type field 720, a hardware address length field 730, a protocol address length field 740, a sender hardware address field 760, a sender protocol address field 770, a target hardware address field 780, and a target protocol address field 790.

The hardware type field 710 may have a size of 2 bytes and may indicate a hardware type. The hardware type may be set as shown in Table 1 below. For example, if the hardware type field 710 is set to '0x0001', it may indicate Ethernet.

TABLE 1

| Number | Hardware Type |
|---|---|
| 0 | Reserved |
| 1 | Ethernet (10 Mb) |
| 2 | Experimental Ethernet (3 Mb) |
| 3 | Amateur Radio AX.25 |
| 4 | Proteon ProNet Token Ring |
| 5 | Chaos |
| 6 | IEEE 802 networks |
| 7 | ARCNET |
| 8 | Hyperchannel |
| 9 | Lanstar |
| 10 | Autonet Short Address |

The protocol type field 720 may have a size of 2 bytes and may indicate an internet protocol (IP) version. For example, the protocol type field 720 may indicate IPv4, IPv6, asynchronous transfer mode (ATM), and the like. For example, if the protocol type field 720 is set to '0x0800', it may indicate the IPv4. The hardware address length field 730 may have a size of 1 byte and may indicate the length of a hardware address (e.g., a MAC address). For example, in the case of Ethernet, the hardware address field 730 may indicate 6 bytes. The protocol address field 740 may have a size of 1 byte and may indicate the length of a protocol address (e.g., network layer address). For example, if the IPv4 is used, the protocol address field 740 may indicate 4 bytes.

The operation field 750 may have a size of 2 bytes and may include an operation code. The operation code may indicate the type of ARP frame. For example, if the operation code is set to 1, it may indicate an ARP request, and if the operation code is set to 2, it may indicate an ARP reply. If the operation code is set to 3, it may indicate a reverse ARP (RARP) request, and if the operation code is set to 4, it may indicate a RARP reply.

The sender hardware address field 760 may have a size of 6 bytes and may indicate a sender hardware address (e.g., a sender MAC address). The sender protocol address field 770 may have a size of 4 bytes and may indicate a sender protocol address (e.g., a sender IP address). The target hardware address field 780 may have a size of 6 bytes and may indicate a target hardware address (e.g., a target MAC address). The target protocol address field 790 may have a size of 4 bytes and may indicate a target protocol address (e.g., a target IP address).

Referring again to FIG. 6, the gateway may measure the magnitudes of the currents (or voltages) at the power switches after obtaining the addresses of the communication nodes (S610). Here, the step S600 of obtaining the addresses of the communication nodes may be omitted, in which case the gateway may perform the step S610 first if the vehicle network is formed. The power switches of the gateway may measure the magnitudes of the currents (or voltages) supplied to the communication nodes through the corresponding ports in real time, and report the measured result to the MCU of the gateway. For example, the power switch of the gateway may report the measured magnitude of the current (or voltage) to the MCU of the gateway, when the measured magnitude of the current (or voltage) is greater than or less than a predetermined current (or voltage) threshold value (or a range of predetermined threshold values).

The MCU of the gateway may compare the magnitude of the current (or voltage) with the predetermined current (or voltage) threshold value (or the range of predetermined threshold values) (S620, S630). Here, the predetermined current (or voltage) threshold value (or the range of predetermined threshold values) may indicate the magnitude of the current (or voltage) to be measured when the communication node normally operates. In the case that the magnitude of the measured current is larger than the predetermined current threshold value (or, in the case that the magnitude of the measured voltage is smaller than the predetermined voltage threshold value), this may indicate that the circuit constituting the communication node is in a short state.

In the case that the magnitude of the measured current is smaller than the predetermined current threshold value (or, in the case that the magnitude of the measured voltage is greater than the predetermined voltage threshold value), it may indicate that the circuit constituting the communication node is in an open state. Here, a current larger than the predetermined current threshold value may be referred to as an "over-current," and a current smaller than the predetermined current threshold value may be referred to as a "low-current". Further, a voltage greater than the predetermined voltage threshold value may be referred to as an "over-voltage," and a voltage less than the predetermined voltage threshold value may be referred to as a "low-voltage".

For example, when an over-current is detected in the second power switch 422-2 of the gateway, this may indicate that the circuit constituting the first end node 430 connected to the port P22 is in a short state. Also, when a low-current is detected in the fourth power switch 422-4 of the gateway, this may indicate that the circuit constituting the fourth end node 460 connected to the port P24 is in an open state.

The gateway may immediately stop the power supply to the corresponding end node when an over-current (or a low-current, an over-voltage, or a low-voltage) is detected (S660). For example, the MCU of the gateway may send an OFF signal to the power switch of the gateway, and the power switch that receives the OFF signal may stop the power supply. Alternatively, the gateway may compare the duration of the over-current (or the low-current, the over-voltage, or the low-voltage) with a predetermined time (e.g., 100 ms) (S640, S650). The predetermined time may be a time for filtering such as ripple, noise, and the like. The gateway may stop the power supply if the duration of the over-current (or the low-current, the over-voltage, or the low-voltage) is greater than the predetermined time (S660). For example, the MCU of the gateway may send an OFF signal to the corresponding power switch of the gateway, and the corresponding power switch that receives the OFF signal may stop the power supply to the corresponding end node.

The gateway may store fault-related information in a database when a fault occurs. The fault-related information may include an indicator indicating whether a fault has occurred, a code indicating a fault type, an identifier of the faulty communication node (e.g., PHY address, MAC address, etc.). In addition, the gateway may generate a frame including the fault-related information and transmit the generated frame (S670). The frame may be transmitted in a broadcast or multicast manner.

The gateway may generate the frame based on the ARP. In this case, the code indicating the type of the fault may be included in the operation field included in the ARP header of the frame. The code indicating the type of the fault may be set to be one of the operation codes. For example, a code indicating the short state may be defined as '0xFF0A' and a code indicating the open state may be defined as '0xFF0B'. The code indicating the short state or the open state is not limited to the above-described example, and may be variously configured.

Therefore, the gateway may set the operation field included in the ARP header of the frame to '0xFF0A', when it is determined that the circuit constituting the communication node is in a short state. Alternatively, the gateway may set the operation field included in the ARP header of the frame to '0xFF0B', when it is determined that the circuit constituting the communication node is in an open state. Further, the frame may further include an identifier (e.g., a PHY address, a MAC address, etc.) indicating the communication node in a short state or an open state.

Meanwhile, a communication node (or a diagnostic apparatus located outside the vehicle network) may receive the frame including the fault-related information from the gateway. The communication node may identify the type of the fault based on the operation field included in the ARP header of the received frame. For example, if the operation field is set to '0xFF0A', the communication node may identify that the circuit is in a short state, and if the operation field is set to '0xFF0B', the communication node may identify that the circuit is in an open state. Further, the communication node may identify the communication node in a short state or an open state based on the identifier of the communication node included in the frame.

The above-described procedure for notifying the fault-related information using the ARP frame may be referred to as a power management resolution protocol (PMRP). The PMRP may be compatible with the ARP. Thus, the above-described ARP frame may be referred to as a frame generated based on the PMRP.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure.

What is claimed is:

1. An operation method of a first communication node in a vehicle network, the method comprising:
   measuring a magnitude of a current supplied to a second communication node through a data line in the vehicle network;
   comparing the measured magnitude of the current with a predetermined threshold value;
   generating an address resolution protocol (ARP) frame including fault-related information when the second communication node is determined to be in a fault state based on a result of the comparison; and
   transmitting the ARP frame.

2. The operation method according to claim 1, wherein the fault-related information includes at least one of: an indicator indicating whether a fault has occurred, a code indicating a type of a fault, and an identifier of the second communication node in the fault state.

3. The operation method according to claim 2, wherein the code indicating the type of the fault is included in an operation field included in an ARP header of the ARP frame.

4. The operation method according to claim 2, wherein the identifier of the second communication node in the fault state is a physical (PHY) layer address or a medium access control (MAC) layer address.

5. The operation method according to claim 1, wherein the magnitude of the current is measured by a switch controlling a power supply included in the first communication node.

6. The operation method according to claim 1, wherein the first communication node is a gateway.

7. The operation method according to claim 1, further comprising:
   determining the second communication node is in a short state when the measured magnitude of the current is greater than the predetermined threshold value; and
   determining the second communication node is in an open state when the measured magnitude of the current is less than the predetermined threshold value.

8. The operation method according to claim 1, further comprising:
   determining the second communication node is in a short state when a current greater than the predetermined threshold value lasts for a predetermined time or longer; and
   determining the second communication node is in an open state when a current less than the predetermined threshold value lasts for the predetermined time or longer.

9. The operation method according to claim 1, further comprising stopping power supply to the second communication node through the data line when the second communication node is determined to be in the fault state.

10. The operation method according to claim 1, further comprising storing the fault-related information in a database when the second communication node is determined to be in the fault state.

11. A first communication node in a vehicle network, the first communication node comprising:
    at least one switch controlling a power supply;
    a processor controlling the at least one switch; and
    a memory storing at least one instruction code executed by the processor,
    wherein, when the at least one stored instruction code is executed, the processor is caused to:
      measure a magnitude of a current supplied to a second communication node through a data line in the vehicle network;
      compare the measured magnitude of the current with a predetermined threshold value;
      generate an address resolution protocol (ARP) frame including fault-related information when the second communication node is determined to be in a fault state based on a result of the comparison; and
      transmit the ARP frame.

12. The first communication node according to claim 11, wherein the fault-related information includes at least one of: an indicator indicating whether a fault has occurred, a code indicating a type of a fault, and an identifier of the second communication node in the fault state.

13. The first communication node according to claim 12, wherein the code indicating the type of the fault is included in an operation field included in an ARP header of the ARP frame.

14. The first communication node according to claim 12, wherein the identifier of the second communication node in the fault state is a physical (PHY) layer address or a medium access control (MAC) layer address.

15. The first communication node according to claim 11, wherein the second communication node is determined to be in a short state when the measured magnitude of the current is greater than the predetermined threshold value, and the second communication node is determined to be in an open state when the measured magnitude of the current is less than the predetermined threshold value.

16. The first communication node according to claim 11, wherein the second communication node is determined to be in a short state when a current greater than the predetermined threshold value lasts for a predetermined time or longer, and the second communication node is determined to be in an open state when a current less than the predetermined threshold value lasts for the predetermined time or longer.

* * * * *